Figure 1:
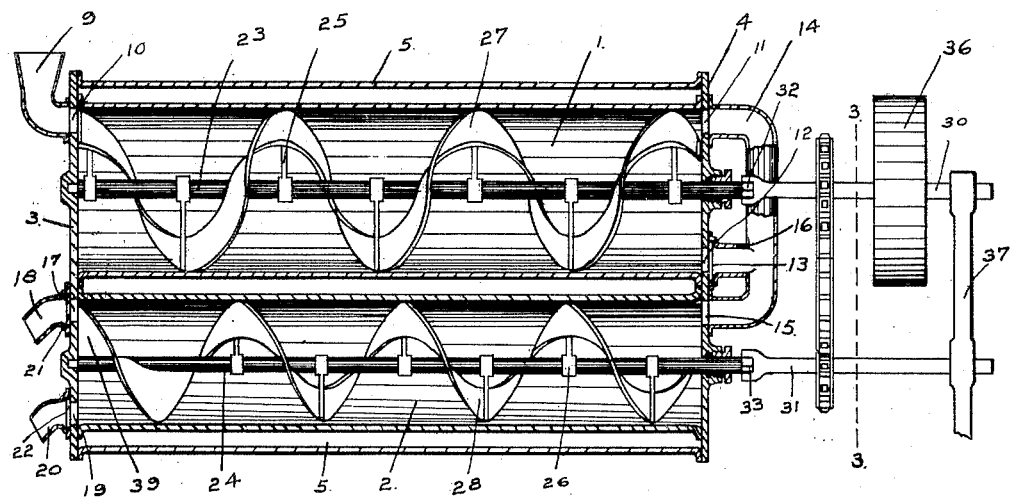

J. H. CARPENTER.
CONTINUOUS ICE CREAM FREEZER.
APPLICATION FILED JAN. 18, 1912.

1,076,950.

Patented Oct. 28, 1913.

Witnesses
H. M. Gillespie
A. L. Phelps

Inventor
John H. Carpenter
By C. C. Shepherd
Attorney

UNITED STATES PATENT OFFICE.

JOHN H. CARPENTER, OF COLUMBUS, OHIO, ASSIGNOR OF THREE-FOURTHS TO JAMES H. NOON, OF COLUMBUS, OHIO.

CONTINUOUS ICE-CREAM FREEZER.

1,076,950.  Specification of Letters Patent.  Patented Oct. 28, 1913.

Application filed January 18, 1912. Serial No. 671,855.

*To all whom it may concern:*

Be it known that I, JOHN H. CARPENTER, a citizen of the United States, residing at Columbus, in the county of Franklin and State of Ohio, and whose post-office address is 1221½ North High street, Columbus, Ohio, have invented certain new and useful Improvements in Continuous Ice-Cream Freezers, of which the following is a specification.

My invention pertains to continuous ice cream freezers and particularly relates to that class of ice cream freezers wherein the material to be frozen is initially introduced at one end of a series of receptacles and is passed through such receptacles under subjection to the freezing influence of ammonia or brine, being at the same time given a tendency toward movement to its point of exit in the form of ice cream.

One of the essential features of my invention resides in the provision of a structure which is effective to insure a reasonably complete freezing and congealing of the material before passage of the same from one receptacle to the other. In effecting this result, advantage is taken of the natural expansive tendency of the material in its conversion from a liquid to a congealed state and in addition there are utilized agitating means which are capable of and have a conveying action in the direction of the point of emission of the frozen material. In the insuring of this comparatively complete congealing of the material in one receptacle before permitting the same to pass into the subsequently effective receptacle, I provide a normal exit for the frozen or congealed material at an uppermost point in the delivery end of the first receptacle, so that the congealed material must be elevated to a height near the top of the receptacle before it is discharged. However, in conjunction with this I desirably provide a drainage port near the lower side of the delivery end of said receptacle, means being provided to normally shut off the outflow from such drainage port.

One other feature of my invention resides in the provision of a plurality of adjacent receptacles and a single inclosing casing therefor, which is spaced therefrom to provide a chamber for the circulation of the ammonia or brine to be used.

The dasher structure of my invention may be somewhat varied as to form and in the accompanying drawings I have shown two different forms thereof.

The preferred embodiment of my invention is shown in the accompanying drawings, in which similar characters of reference designate corresponding parts, and in which—

Figure 2:
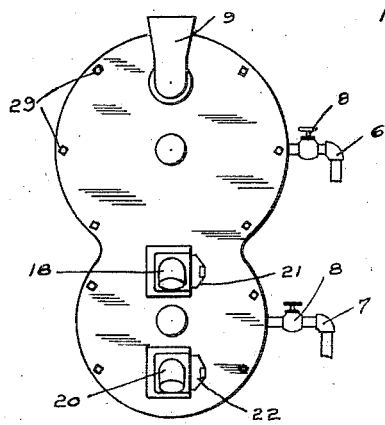
Figure 3:
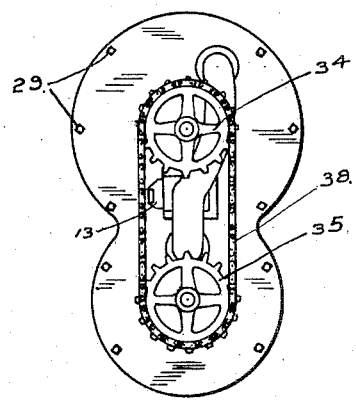
Figure 4:
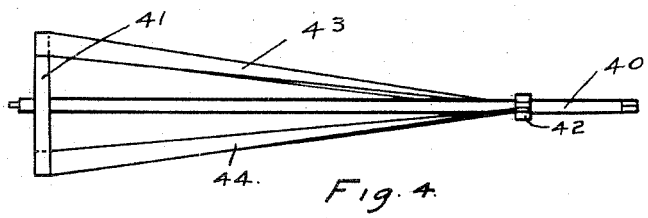
Figure 5:
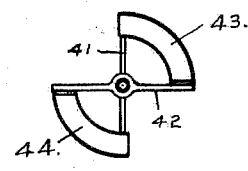

Figure 1 is a longitudinal vertical section of my assembled freezer, Fig. 2 is an end elevation looking from the left of Fig. 1, Fig. 3 is a view taken on line 3—3 of Fig. 1, looking from the right, Fig. 4 is a detail view of a modified form of dasher which may be utilized by me, and, Fig. 5 is an end elevation of the dasher shown in Fig. 4.

In the drawings, my freezer is shown as comprising two superposed cylinders 1 and 2, having their ends closed by plates 3 and 4 and surrounded by a jacket 5 which is spaced therefrom and particularly embracing such cylinders to form a refrigerant passage in contact with all the walls thereof. This passage is supplied in any preferred manner with brine or ammonia and one manner of supplying the same may be seen by reference to Fig. 2, wherein inlet and outlet pipes 6 and 7 are disclosed, such inlet and outlet pipes being controlled by turning plugs 8.

The cylinder 1 is fed with the material in uncongealed form through the medium of a funnel structure 9 and a port 10. This port 10 is formed in the plate 3, while in the plate 4 at the opposite end of the cylinder 1 are ports 11 and 12, the former constituting a normal delivery port for the frozen material and the latter being a drainage port and normally closed by a gate valve 13. Leading from the port 11 is a connecting pipe 14 which leads to a port 15 in the plate 4, which port 15 constitutes the inlet port for the receptacle 2. An intersecting pipe 16 joins the pipe 14 and forms a connecting passage from the drainage port 12 thereto. The opposite end of the cylinder 2 is provided with a delivery port 17 and spout 18 at the highest point therein and at the lowest point therein there are provided the port 19 and spout 20. These ports are desirably normally closed by valves 21 and 22. Mounted within these cylinders or receptacles 1 and 2 are rotatable shafts 23 and 24, which have radial brace members 25 and 26 supporting spiral and continuous dasher paddles 27 and 28. The spiral nature of these dasher paddles is such as to produce a conveying action longitudinally of the cylinders or receptacles and it will be understood that the material fed through the port 10 is carried continuously toward the opposite end of the cylinder 1 and is delivered through the ports 11, through the connecting pipe 14 by which it is carried through the port 15 and into the cylinder 2, being ejected therefrom through the port 17 and spout 18. These dasher shafts 23 and 24 are journaled in any preferred manner upon the plates 3 and 4, which are removable by releasing the bolts 29 and thus the dashers may be readily removed inasmuch as they are driven by means of socketed shafts 30 and 31 fitting over the squared ends 32 and 33 of the dasher shafts. These shafts 30 and 31 are driven in the same direction by sprockets 34 and 35 and chain 38, one of such shafts having a pulley 36 thereon. The direction of movement of the material, however, is opposite in the two cylinders since one of the dashers is right hand, while the other is left hand. The shafts 30 and 31 may be supported in any preferred manner as by the element 37.

In the modification shown in Figs. 4 and 5, the conveying action is greatly reduced, but the scraping effect of the dasher upon the internal walls of the cylinders is increased. It will be noted that the dashers are similar in construction and that the material is introduced upon opposite sides of each dasher in a manner to be affected by opposite surfaces thereof in the different cylinders. In addition, the end of the dasher paddle is slightly enlarged as at 39, while the remainder of the same is slightly spaced from the central driving shaft in each instance. This spacing of the dasher paddle creates a tendency to feed the more stiffly frozen material which is constantly gathering upon the internal walls of the cylinders.

The modified form of dasher comprises a central shaft 40, radial arms 41 and 42, and scraper blades 43 and 44.

It will be seen that I have provided a structure of continuous freezer wherein the material gathers in the initial receptacle and during the freezing thereof it must expand so as to practically force itself out of the exit port at the highest point therein. It is then conducted by the connecting pipe downwardly to the next freezing cylinder and by the conveyer paddle therein is carried toward its point of delivery which is likewise at the highest point in such cylinder. If desired, the drainage ports may be opened and being at the lowest points in the cylinders, permit of a complete cleansing of such cylinders. Furthermore, the end plates of the cylinders are readily removable and thus the dashers may be entirely removed for cleansing of the entire machine. Cleanliness of a machine of this type is particularly important, since failure to amply guard against a lack of the same, very soon spoils the quality of ice cream obtained.

What I claim is—

1. A continuous ice cream freezer comprising a plurality of normally completely inclosed horizontal cream receptacles, dashers in said recepacles, one of said receptacles having an inlet opening at one end, and a connecting conduit leading from the highest point in the opposite end of said last receptacle to the receiving end of the adjacent receptacle, said dashers being constructed to cause continuous forward movement of the cream from the inlet of the first receptacle to the outlet of the last receptacle.

2. A continuous ice cream freezer comprising a plurality of normally completely inclosed horizontal cream receptacles, dashers in said receptacles, one of said receptacles having an inlet opening at one end, a connecting conduit leading from the highest point in the opposite end of said last receptacle to the receiving end of the adjacent receptacle, said dashers being constructed to cause continuous forward movement of the cream from the inlet of the first receptacle to the outlet of the last receptacle, and a drainage pipe leading from the lowest point of the first receptacle to the said conduit, said last receptacle having a discharge opening at the highest point in its delivery end.

3. A continuous ice cream freezer comprising a plurality of receptacles, dashers therein, a connecting pipe leading from the highest point in one of said cylinders to the other cylinder, and a drainage cut-in pipe leading from the first cylinder into said connecting pipe.

In testimony whereof I affix my signature in presence of two witnesses.

JOHN H. CARPENTER.

Witnesses:
WALTER E. S. BOCK,
A. L. PHELPS.